Oct. 8, 1940.   G. E. BOWDOIN ET AL   2,217,153
APPARATUS FOR DRYING
Original Filed Oct. 12, 1935   12 Sheets-Sheet 11

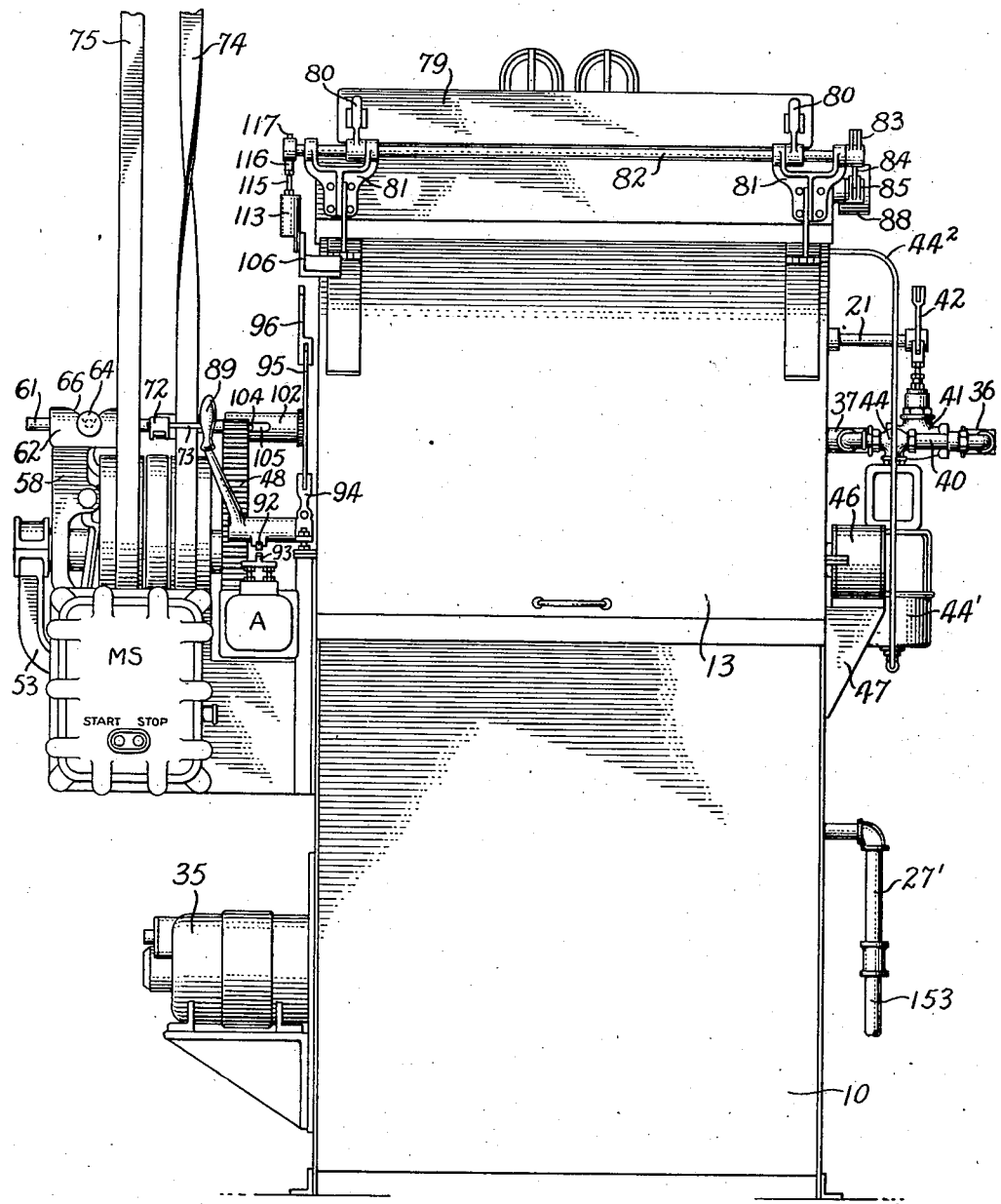

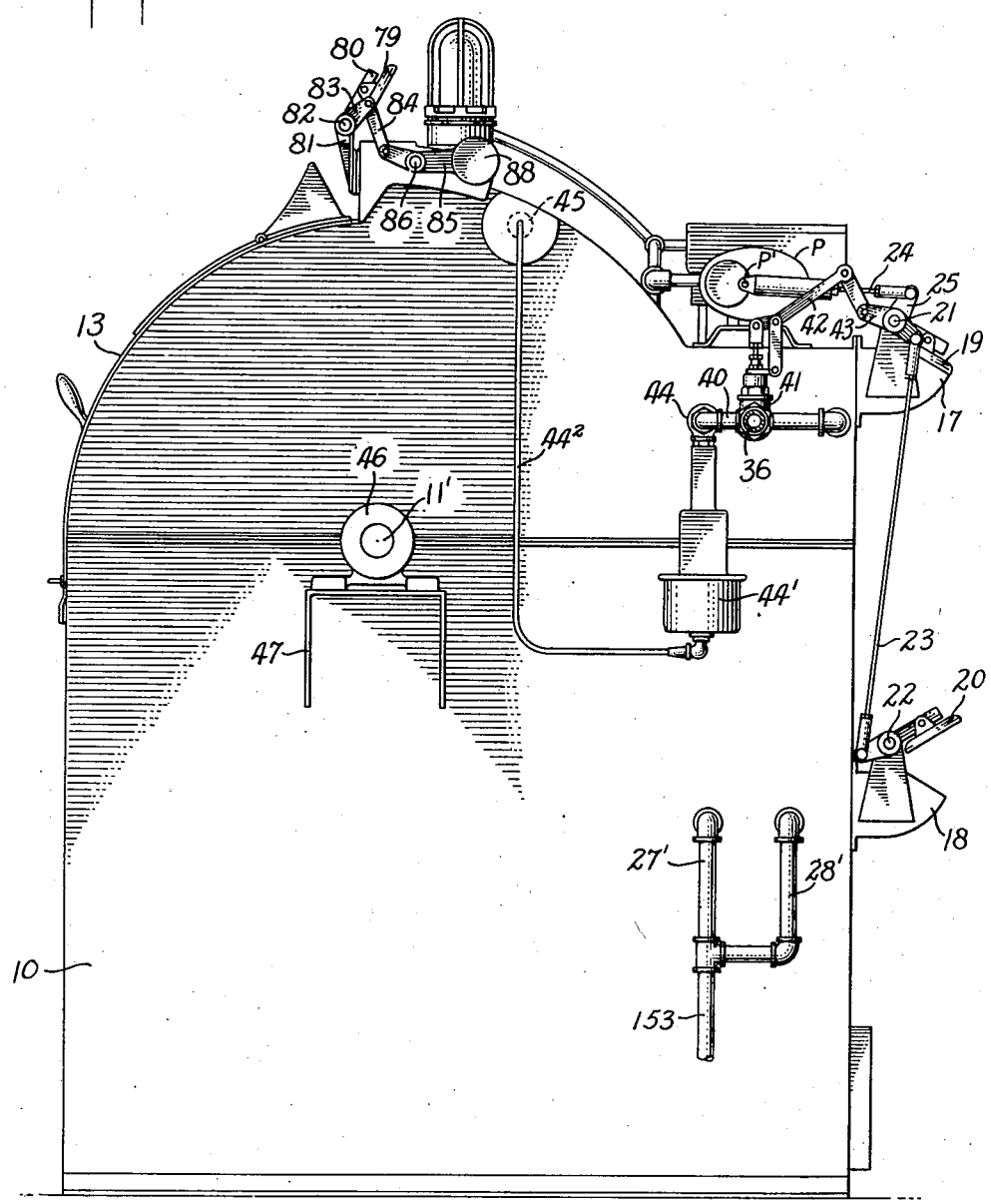

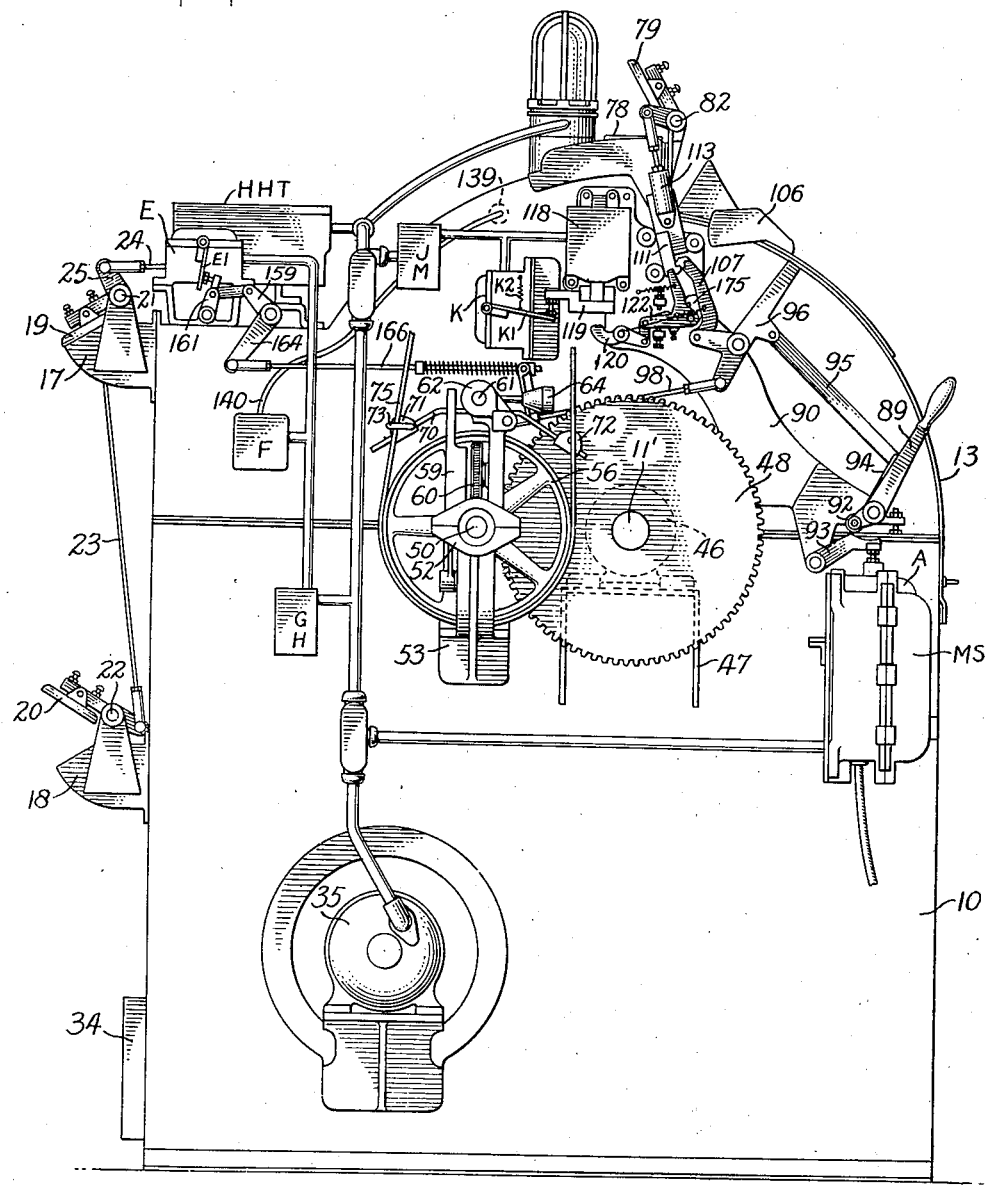

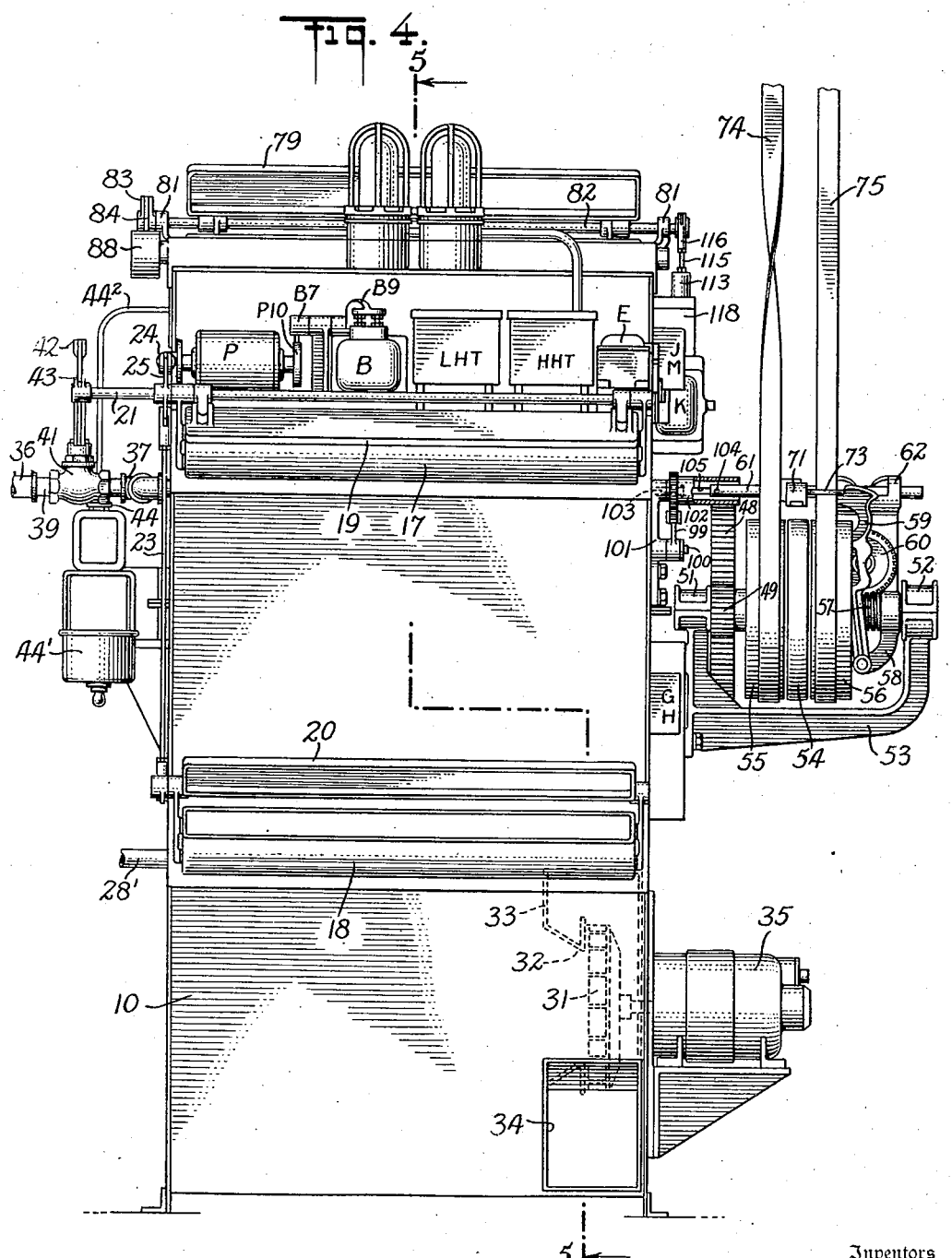

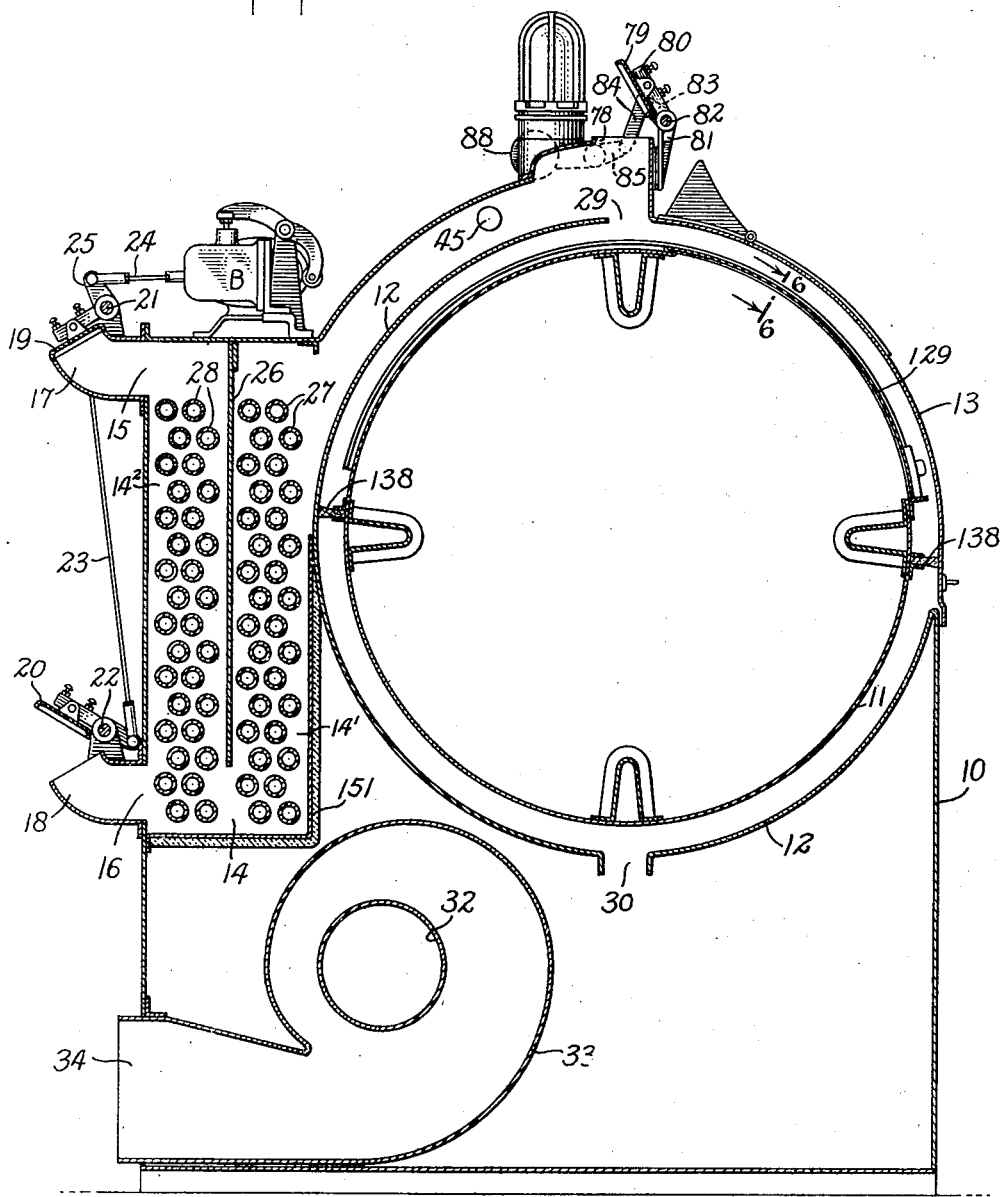

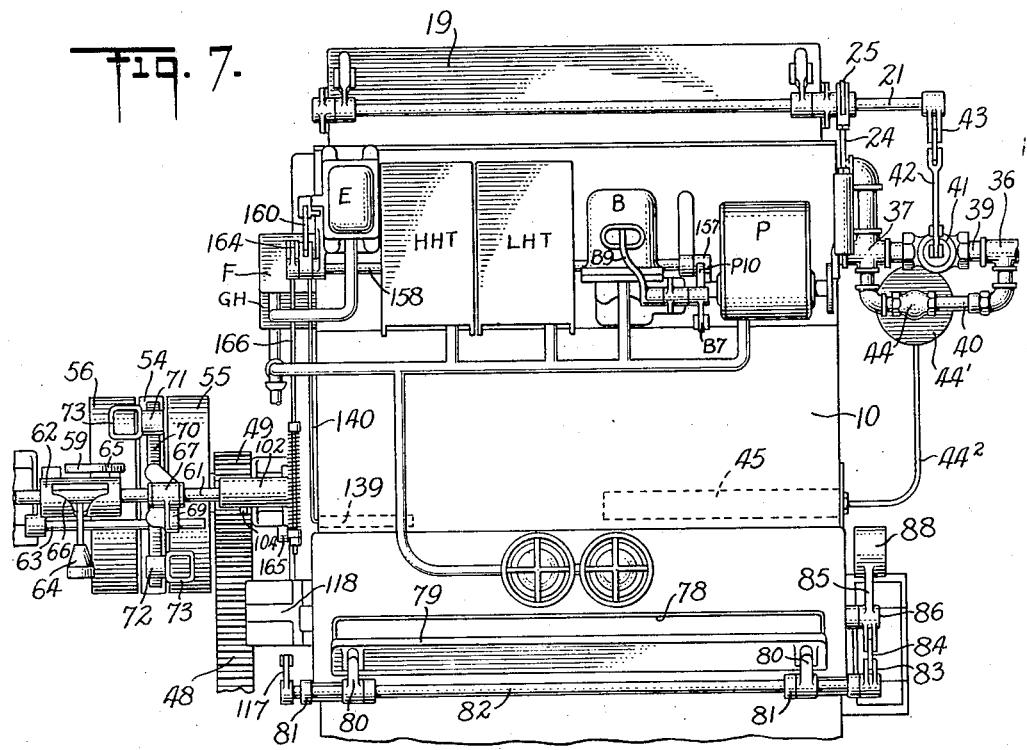

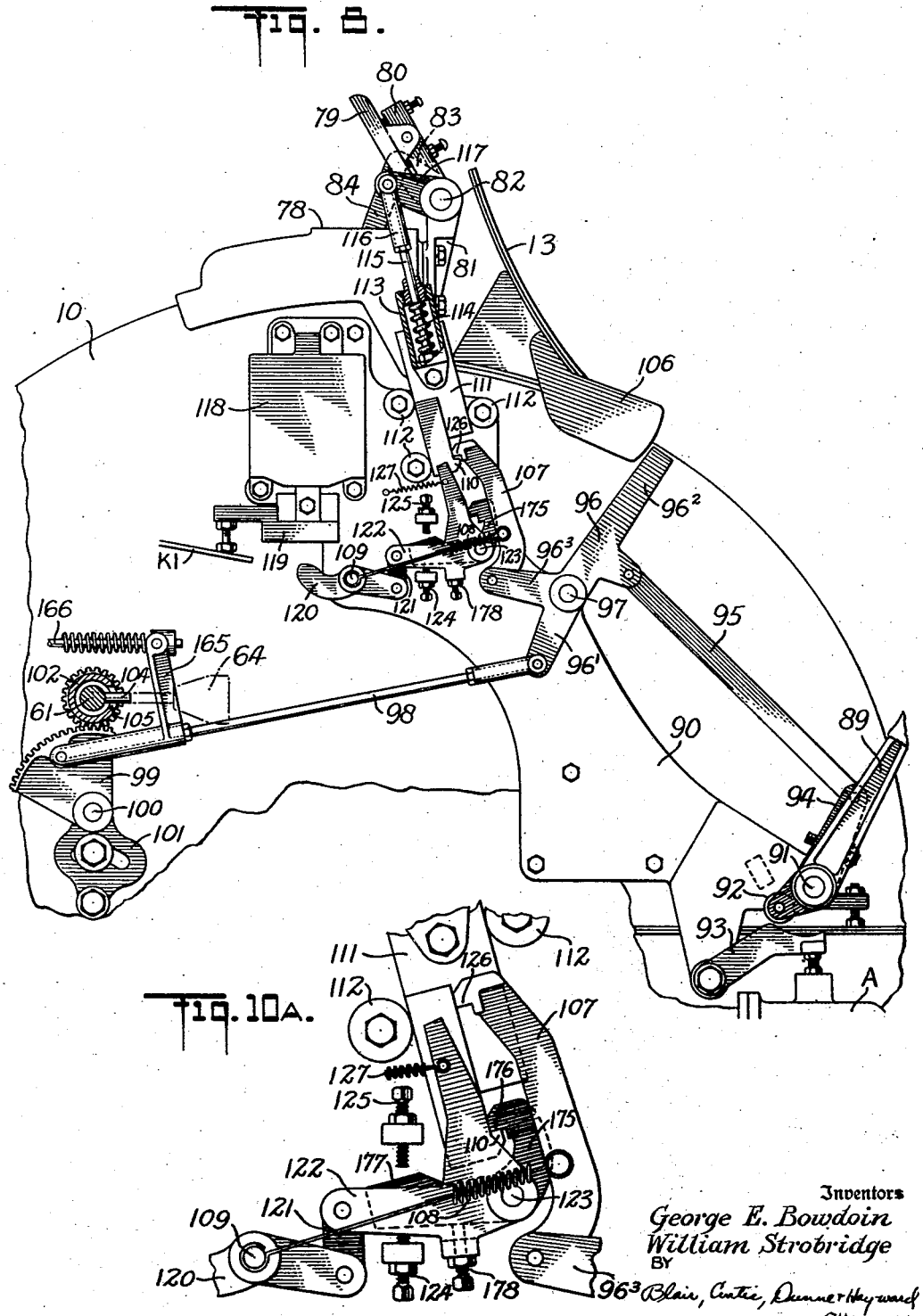

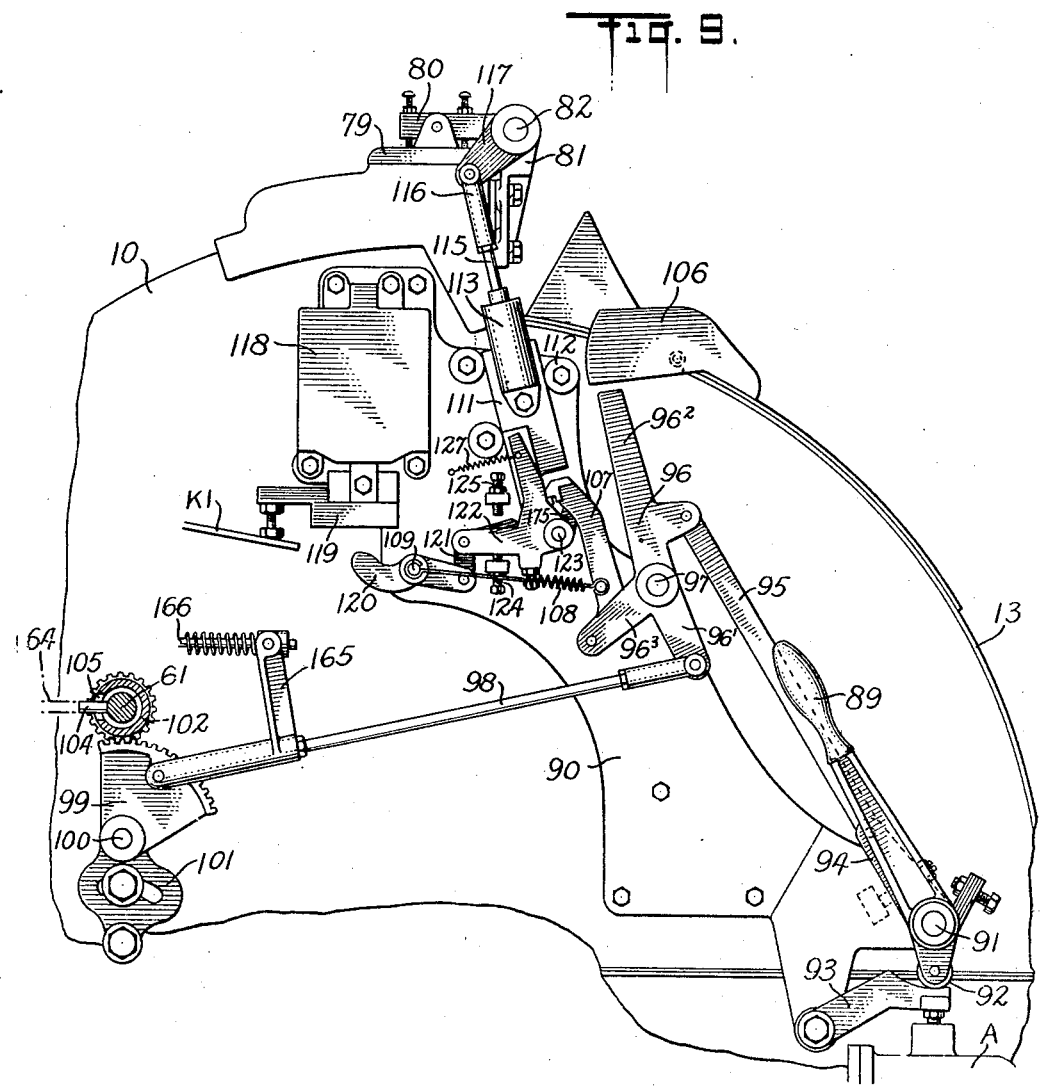

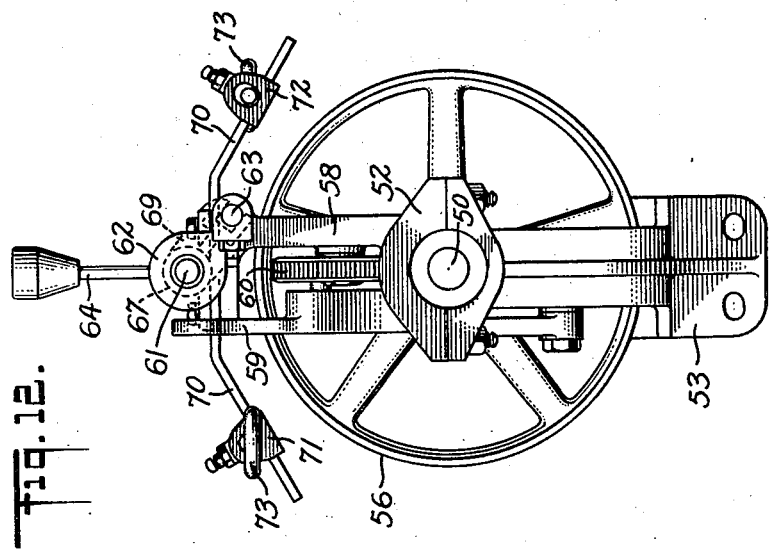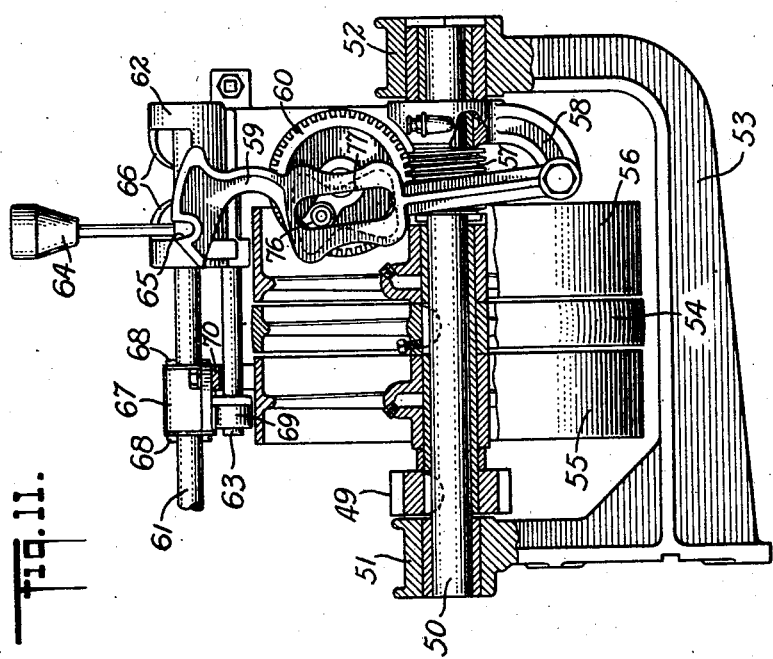

Oct. 8, 1940.　　G. E. BOWDOIN ET AL　　2,217,153
APPARATUS FOR DRYING
Original Filed Oct. 12, 1935　　12 Sheets-Sheet 12

Inventors
George E. Bowdoin
William Strobridge
BY
Blair, Curtis, Dunne + Hayward
Attorneys Patented Oct. 8, 1940

2,217,153

UNITED STATES PATENT OFFICE 2,217,153

APPARATUS FOR DRYING

George E. Bowdoin, New York, and William Strobridge, Syracuse, N. Y., assignors to United States Hoffman Machinery Corporation, New York, N. Y., a corporation of Delaware Original application October 12, 1935, Serial No. 44,724. Divided and this application March 27, 1937, Serial No. 133,344

12 Claims. (Cl. 34—5)

This invention relates to apparatus useful in dry cleaning, and more particularly to drying materials which have previously been treated with an inflammable cleaning solvent.

This application is a division of application Serial No. 44,724 filed in the United States Patent Office October 12, 1935, now matured into Patent No. 2,142,042, issued Dec. 27, 1938.

Dry cleaning processes may be broadly classified in two categories, viz.: those employing (1) inflammable solvents, such as benzine, gasoline, cleaners' naphtha, Stoddard solvent, and the hydrogenation products of naphthalene—tetralin and decalin; (2) the chlorinated hydrocarbon products such as carbon tetrachloride and tetrachloethylene. The high cost and extremely volatile nature of the latter group of solvents render them unsuitable for dry cleaning in large installations, except in closed systems. These and other disadvantages would be deterrent of their use for dry cleaning purposes, were it not for safety conditions due to their non-inflammable nature. On the other hand, the fact that the petroleum distillates and hydrogenation products of the first group are all explosive at some degree of air-vapor concentration and temperature has heretofore greatly offset the many advantages which are otherwise assured by their use.

For many years Stoddard solvent, a mixture of petroleum distillates, having a flash point in the neighborhood of 105° F., has had a wide use in dry cleaning processes, but since its flash point is within the range of possible workroom temperatures, its use, and similarly, the use of solvents of lower flash point, has been penalized in the sense that various statutes, ordinances, and rulings of fire insurance rate-setting boards have required dry cleaning operations involving the use of such inflammable solvents to be carried on in separate or detached buildings of special construction.

Dry cleaning according to the open batch system usually includes handling a batch of clothing or other articles in successive stages, as follows: The batch is first treated in a washing machine, preferably of the horizontal cylinder type, by agitation in intimate contact with the solvent for a period of sufficient duration to accomplish the desired degree of cleansing. It is then rinsed in clean solvent, drained, and transferred to a centrifugal extractor where from 80% to 90% of the remaining solvent is thrown off. The clothing is then transferred to apparatus where it is dried and deodorized in a rotary drum through which heated air is drawn. The air is ordinarily heated by a set of steam coils over which the air passes on its way to the drum. It will be understood that danger of explosion in the washer is extremely remote, since in such apparatus the air is not heated and attains such a high degree of solvent saturation that ignition is practically impossible under any likely conditions of operation. It is to be noted, however, that precautions are usually taken to prevent static electrical discharges. The operation of the centrifugal extractor is also substantially free from explosion risk.

The chief point of danger lies in the drying apparatus, for here, according to usual practice, highly heated air is brought into contact with the solvent under conditions likely to foster the accumulation of an explosive mixture. In the past, it has been known to attempt to remedy this danger by drawing the heated air rapidly through the dryer in the hope of keeping the air-vapor mixture below explosive concentration. But such methods as have been developed on this principle, although perhaps in some cases operative to reduce the danger somewhat, are in many respects defective and cannot be depended upon to lower the risk to the degree that safety demands. For example, soon after the beginning of the drying operation, while the clothing still contains an appreciable quantity of solvent, the highly heated air might take up sufficient vapor to produce, if only for a brief period, an explosive mixture at or above the flash point of the solvent.

To a lesser degree, the danger inherent in the use of solvents having flash points commensurate with room temperatures is also present in the use of the hydrogenation solvents above mentioned. Hydronaphthalenes are now produced commercially by certain German processes, and otherwise, which not only offer superior solvent qualities, but which range in flash point from about 140° F. to 170° F. with boiling points covering the range from about 365° F. to around 420° F. It is also possible today to purchase at a reasonable cost hydrocarbon distillation products of excellent solvent quality, having a flash point close to 140° F. and a distillation range from 350° F. to 410° F. The advantages due to the superior solvent qualities and relatively high flash point of such solvents are somewhat offset by their higher boiling points (relative to the low flash point solvents hereinbefore discussed) necessitating as they do higher temperatures for accomplishing the complete drying and deodorization of the dry cleaned goods within an economically short period of time.

Having in mind the great demand existing for accomplishing with safety dry cleaning the drying operations with the employment of solvents having the characteristics of any or all of the inflammable solvents hereinbefore mentioned, it is an object of the present invention to provide suitable apparatus for attaining this purpose. It is a further object of this invention to provide drying apparatus in which the materials to be dried are first subjected to a flow of air maintained at a safe temperature relatively to the flash point of the solvent used in the preceding washing operation to remove the greater part of said solvent, then subjected to a flow of air at a temperature or temperatures considerably higher than the said flash point, and, finally, subjected again to a flow of air at a safe temperature relatively to flash point to cool and complete the deodorization of the said materials and bring the temperature within the dryer down to a point where the cycle of operation may immediately be repeated with safety.

A further object of the invention is to provide improved control mechanism and safety devices which are automatic in operation. More specifically, it is an aim of the present invention to maintain at all times safe temperatures within the apparatus in relation to the flash point of the solvent contained in the materials treated and in relation to the vapor concentration during the various stages of the drying cycle.

Further objects of the invention are in part obvious and in part will be pointed out hereinafter.

The invention accordingly consists in the features of construction, combinations of elements, and arrangement of parts, as will be hereinafter described, and the scope of the application of which will be indicated in the following claims.

In the accompanying drawings, in which is shown a preferred embodiment of the invention capable of use in carrying out the purposes above mentioned:

Fig. 1 is a front elevation of a drying tumbler embodying features of the present invention;

Fig. 2 is a right side elevation thereof;

Fig. 3 is a left side elevation thereof;

Fig. 4 is a back elevation of the tumbler;

Fig. 5 is a cross-section taken on line 5—5 of Fig. 4;

Fig. 6 is an enlarged sectional detail of the cylinder construction on line 6—6 of Fig. 5;

Fig. 7 is a top plan view of the rear portion of the tumbler showing the location of certain of the operating and control devices;

Fig. 8 shows on a larger scale the upper portion of the tumbler, and the control mechanism in the same position it occupies in Fig. 3, the shell door being in open position;

Fig. 9 is a view similar to Fig. 8 showing the control mechanism in a different position and the shell door closed;

Fig. 10 is a view of certain elements of the control mechanism in positions different from those occupied by the same elements in Figs. 3, 8, and 9;

Fig. 10A is a view showing the control elements of Fig. 10 in still different positions;

Figs. 11 and 12 are respectively back and side elevations, on an enlarged scale, of the belt pulley and belt shifting header assembly;

Similar reference characters refer to similar parts throughout the various views of the drawings.

Figure 13:
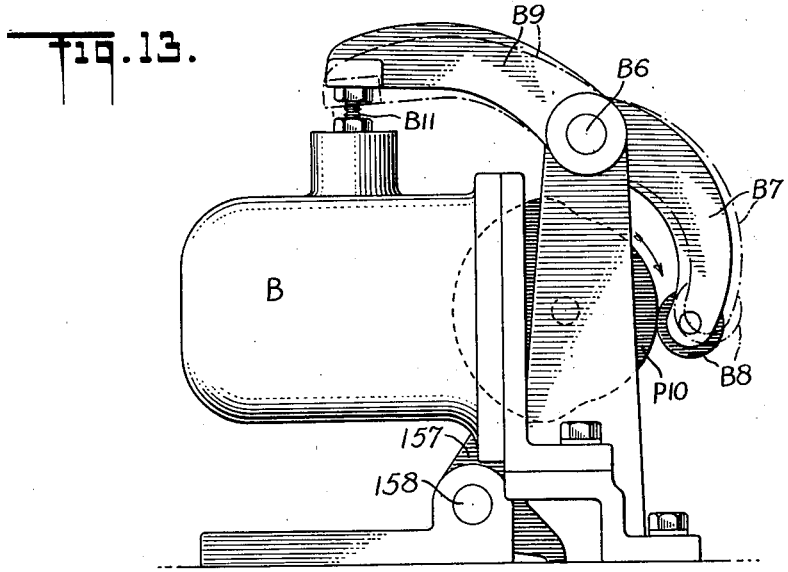
Figs. 13 and 14 are respectively elevations of mechanically and electrically actuated switch mechanisms which become effective at different stages of the drying cycle to control certain phases of that cycle.

It will be seen from the foregoing that in carrying out the general purposes of this invention, the apparatus and controls therefor may be modified to suit the special conditions under which dry cleaning takes place. Having in mind the facts: that the treatment of the clothes in the drying tumbler is first conducted at a temperature predetermined in relation to the flash point of the particular solvent used in the preceding steps of the dry cleaning process, and that the length of this preliminary drying stage is determined by test as sufficient to dry the clothing to a degree making it possible and safe thereafter to submit the clothing in the drying tumbler to highest heat, in order rapidly to complete the drying of the clothes and effect efficient deodorization thereof, it will be evident that in the case of a solvent having a flash point substantially above any possible workroom temperature the heat during the preliminary heating period may with safety be maintained at a temperature well above that of the workroom but substantially below the flash point of the particular solvent used. Under such conditions, there can be no danger of explosion taking place within the tumbler. Drying apparatus for a solvent of this nature will include heating means and heat and time controls, adapted to heat the air entering the tumbler to the desired low heat drying temperature and maintain that temperature long enough to accomplish the desired degree of drying.

Under other conditions, as when the solvent used for dry cleaning has a flash point below or substantially at workroom temperatures, the principles of the process remain the same, but the apparatus and controls will be of a character to render possible holding the temperature of the air in the drying tumbler during the low heat drying period not only below the flash point of the solvent, but also, if necessary, below the temperature of the workroom.

To meet the conditions of the first case, one form of apparatus will now be described, although it is obvious that other forms of apparatus may be designed to carry out the principles of the invention.

*Description of apparatus*

Reference to Figs. 1 to 5, inclusive, may be had for a general conception of the preferred form of apparatus. There is disclosed a tumbler comprising an outer shell or casing 10 having rotatably mounted therein a foraminous drum 11. The drum 11 is surrounded by an internal cylindrical shell 12 which encloses the drum for approximately three-quarters of the periphery thereof, the hinged outer shell door 13 at the front of the tumbler housing completing the enclosure. To the rear of the drum chamber is formed a rectangular coil box 14, connected with the atmosphere through the rear plate of the housing by means of two air inlets 15 and 16, the inlet 15 giving access of air to the upper portion of the coil box and the inlet 16 at a point near the bottom of the coil box. These two inlets are equipped respectively with rectangular air intake nozzles 17 and 18 adapted to be opened or closed to the atmosphere by means of dampers 19 and 20. The damper 19 is rotatably mounted upon a shaft 21 and similarly the damper 20 is rotatably mounted upon a shaft 22. These dampers are connected in predetermined relationship by means of an adjustable rod 23, the length of the rod and its mode of attachment to the two dampers being such that whenever one of said dampers is open the other will be closed. The operation of the dampers is automatic and is controlled by means of a half-turn motor P, the crank pin $P^1$ of which is connected by means of an adjustable connecting rod 24 to the crank arm 25 mounted upon the shaft 21 of the upper damper.

*The heater*

The coil box 14 is divided into two compartments $14^1$ and $14^2$ by means of a vertical partition 26 which extends downwardly from the top plate of the coil box to within a short distance of the bottom of the coil box. Thus the two coil box compartments communicate at their lower ends adjacent the lower air inlet 16. Located in the compartment $14^1$ is a steam coil 27 and in the compartment $14^2$ is a steam coil 28. Air from the inner compartment $14^1$ is led to the top of the tumbler and admitted to the tumbler drum through an opening 29 in the inner shell 12. The outlet from the cylindrical drum chamber is through an opening 30 at the bottom of the shell 12, opposite the opening 29. This outlet 30 forms a passage for the air into the lower part of the tumbler housing beneath the drum chamber, where there is located a rotary fan 31 to which air is admitted from the lower part of the housing through an inlet 32 formed in the fan housing 33. The outlet of the fan housing 33 is at 34 projecting through the rear wall of the tumbler housing near the bottom thereof.

The fan 31 is driven by a direct connected motor 35 and serves to draw air through the air inlet 15 over both coils 28 and 27, or through air inlet 16 over the inner coil 27 only, thence by way of the air inlet 29, down through the drum chamber, and by way of outlet 30 into the lower part of the tumbler housing, whence the air is exhausted to the atmosphere, preferably outside of the building in which the tumbler is installed.

In order that heat shall not be transferred from the coil box to the tumbler drum otherwise than by the heated air drawn through the drum, the coil box should be well insulated from the drying space within the tumbler. It is therefore desirable to insulate the coil box, as by means of an adequate heat-insulating medium, as indicated at 151 in Fig. 5.

The steam connections to and from the independently connected coils 27 and 28 may best be understood by reference to Figs. 1, 2, 4 and 7. Live steam is brought to a fitting 36 which connects with a cross fitting 37 having connections to the upper ends of both the inner and outer steam coils 27 and 28. Connection from the fitting 36 to the cross fitting 37 is made through a main steam line 39 and a branch steam line 40. In the main steam line 39 is disposed a shut-off valve 41 operated automatically by means of a lever 42 suitably connected to a crank arm 43 fastened upon the damper-operating shaft 21.

Thus the steam through the main line to both coils is controlled by operation of the half-turn motor P. In by-pass or branch line 40 there is installed a thermostatically controlled valve 44, the diaphragm chamber $44^1$ of which is connected by means of flexible tubing $44^2$ to the bulb 45 located in the air space at the top of the tumbler between the outer and the circular inner shell. Thus the operation of the valve 44 is controlled by the temperature of the air at the top of the tumbler before it has access to the tumbler drum containing the materials being dried. Steam coils 27 and 28 are connected at their lower ends by means of pipes $27^1$ and $28^1$ to the steam return pipe 153. The tumbler drum 11 is journaled in bearings 46 mounted on brackets 47 secured to the side plates of the tumbler housing.

*Cylinder drive*

Upon the drum shaft $11^1$ is mounted a spur gear 48 driven by a pinion 49 mounted upon a jack shaft 50 forming part of a pulley and belt shifting header assembly, for a better understanding of which reference is made to Figs. 11 and 12 in which the jack shaft 50 is shown to be rotatably mounted in a pair of bearings 51, 52 carried by a header bracket or arm 53. This bracket is bolted to the side of the tumbler housing. The jack shaft 50 carries a tight pulley 54 and a pair of loose pulleys 55, 56. Also loosely mounted upon the shaft 50 is the header worm 57 which has a pin-and-slot connection with the hub of the loose pulley 56 so as to be driven thereby. Mounted upon the header bracket 53 in coaxial relation to the shaft 50 is a header arm assembly comprising the support 58, to which is pivotally connected the belt shifter fork 59.

The header arm assembly includes a worm gear 60 on support 58 meshing with the worm 57, and a reciprocating slide shaft 61, slidably and rotatably mounted at the upper end of the support 58 in a block 62. Projecting from the block 62 parallel to the shaft 61 is a guide rod 63. A weighted pin or header fall 64 secured to and extending at right angles to the slide shaft 61 shifts with the slide shaft about its axis so that the pin 64 may engage the notch 65 formed in the upper end of the shifter fork 59 when the pin 64 is swung in one direction to a horizontal position, and when swung in the opposite direction to a horizontal position will be free of the shifter fork 59, but will engage one or the other of the beveled surfaces 66 formed on the block 62 and ride down to a neutral position. Near the end of the slide shaft 61 which is nearest the tumbler housing is a shifter sleeve 67 loosely mounted upon the said slide shaft, but held against endwise movement by means of cotter pins 68. This shifter sleeve carries a forked arm 69 cooperating with the guide rod 63 to prevent the shifter sleeve 67 from rocking about the axis of the shaft 61. This shifter sleeve carries a shifter arm 70 extending in opposite directions above the belt pulleys and provided with belt guide blocks 71, 72, each equipped with a belt guide 73. The belt guides are so disposed that when the shifter pin 64 occupies its center or neutral position the two drive belts 74, 75 (see Fig. 4) will be positioned upon the loose pulleys so that under these conditions no power will be transmitted to the tumbler drum. It will be noted that the belt 75 is direct and the belt 74 crossed whereby the shifting of one belt off and the other belt on to the tight pulley will effect a reversal of the rotation of the tumbler drum. It will be understood that belts 74 and 75 connect with a suitable line shaft (not shown).

The operation of the header assembly will now be briefly described. It will be noted that since the worm 57 is driven by the loose pulley 56 it will always rotate in the same direction irrespective of the location of the belts with respect to the tight pulley. Thus, also, the worm wheel 60 will rotate constantly in one direction. This wheel drives a crank pin 76 slidable up and down in a slot 77 provided for that purpose in the shifter fork 59. Thus rotation of the loose pulley produces constant oscillation of the shifter fork at a slow rate of speed. When the pin 64 does not engage the notch 65 in the upper end of the shifter fork no motion will be transmitted to the belt guides, but when the pin 64 engages the notch 65, it will cause the slide shaft 61 to reciprocate slowly. This action will periodically shift the driving belts and reverse operation of the tumbler drum. No claim is made to this header construction per se, but, as will be seen hereinafter, it is associated with other control mechanism to insure safe operation of the apparatus.

*Safety air inlet*

At the top of the tumbler housing there is provided an auxiliary air inlet 78 communicating directly with the air outside the tumbler housing and serving as a vent when the fan is not running. This air inlet 78 may be closed by means of a vent damper 79 pivotally mounted upon arms 80 which themselves are rotatably mounted upon brackets 81 secured to the housing. The rock shaft 82 which supports the arm 80 carries a crank arm 83 connected by means of a link 84 to one end of a counterbalanced lever 85 pivotally supported at 86 upon the tumbler housing. The weight lever 85 has mounted at its free end a counterweight 88, the tendency of which is to maintain the vent damper 79 always in an open position. The operation of this damper, as will be hereinafter disclosed, is associated with other automatic control mechanism.

*Mechanical control mechanism*

Referring again to the drawings, mechanical means for setting the tumbler in operation to begin the drying cycle will now be described. It will be noted that in Fig. 8 the vent damper 79 is open, the tumbler shell door 13 is also open, and that the belt-shifting header-fall 64 occupies its disengaged position as in Fig. 3, so that the drum is at rest. The means for shifting the header-fall into or out of engagement to cause belt drive of the tight pulley on the jack shaft comprises an operating lever 89 which, with other operating parts, is mounted upon a cast bed-plate 90 bolted to the side sheet of the tumbler housing. The operating lever 89 is pinned to a shaft 91 rotatable in a bearing-forming part of the said bed-plate casting. Attached to one end of the operating lever is a roller 92 adapted, when the lever 89 is thrown to engage the belt-shifting header-fall in operating position, to come in contact with a camming arm 93, moving said arm 93 to shift a switch A, the purpose of which will be explained hereinafter.

Pinned to the shaft 91 in proper angular relation to the lever 89 is an arm 94, connected by a link 95 to a crank arm 96 which is free to turn about a shaft 97 mounted in bed-plate casting 90. A branch arm 96¹ of crank arm 96 is connected by an adjustable link 98 to a gear segment 99 rotatably mounted on a pin 100 fixed to a casting 101 which is adjustably mounted on the side of the tumbler housing toward the rear of said housing relative to the position of the bed-plate 90. The gear segment 99 meshes with teeth cut on a rotating sleeve 102 rotatably mounted on a pin 103 carried by the bed-plate 101 (see Fig. 4). The rotatable sleeve 102 surrounds an extension of the reciprocating slide shaft 61 of the header assembly hereinbefore described. This extended shaft 61 is provided at the end nearest the tumbler with a pin 104 which projects through a longitudinal slot 105 in the sleeve 102. It is obvious, therefore, that when the operating lever 89 is thrown toward the center of the tumbler to the position shown in Fig. 9, the toggle composed of the members 94, 95 straightens out and causes rotation of the crank arm 96 about its axis of rotation, causing the branch arm 96¹ to assume the position shown in Fig. 9, thus rocking the gear segment 99 toward the front of the tumbler.

This motion of the gear segment causes rotation of the sleeve 102 and because of the engagement of the pin 104 with a side of the slot 105 produces rotation of the shaft 61 in a counter-clockwise direction, as looked at in Figs. 8 and 9, throwing the weighted header pin or fall 64 from the position shown in Fig. 8 to that shown in Fig. 9, where it will engage the slot 65 in the header fork 59, thus, by reason of the slow reciprocation of the shaft 61, shifting one or the other of the driving belts on to the tight pulley 54 and causing rotation of the tumbler drum through pinion 49 and gear 48. It should be noted at this point that straightening the toggle 94, 95 locks the operating lever in the engaged position of the belt-shifting header, thus insuring that the tumbler drum drive will continue until the starting lever 89 is returned to its forward or disengaged position.

*Safety devices associated with mechanical control mechanism*

There will now be described means connected with this operating mechanism for preventing the opening of the shell door 13 when the belt-shifting header is engaged and also for preventing any actuation of the operating mechanism to start rotation of the drum when the shell door is open. There will also be described means associated with this operating mechanism for controlling the operation of the vent damper 79 in association with magnetic means adapted to open the vent damper 79 in case of failure of current to the fan motor 35.

Referring to the drawings, it will be seen that the crank arm 96 is provided with another branch arm 96² which serves to form an interlock between the operating lever 89 and the shell door 13. The latter is equipped with an abutment casting 106 so shaped and disposed that the shell door can be opened only when the operating lever 89 is in its forward or header-disengaging position, as will be clearly understood by comparing the positions of the parts in Figs. 8 and 9. It will be seen that the abutment 106 prevents rearward movement of the branch arm 96², and thus rearward movement of operating lever 89, when the tumbler door stands in open position and, reversely, the said arm 96² opposes movement of the abutment member 106 should an attempt be made to open the door 13 while the operating lever 89 stands in its rearward position, as shown in Fig. 9. Now, since, as will be shown hereinafter, it is impossible that the starting lever 89 be put in engagement position unless current is being supplied to the dryer motor, it follows that the dryer cylinder can not be set in operation until after the fan is started. The crank arm 96 is also provided with a third branch arm $96^3$ which carries pivotally mounted thereon a latch member 107, the movement of which is restrained in one direction by means of a spring 108 attached at one end to the latch member 107 and at the other end to a fixed pin 109. This latch member 107 normally stands in interlocking engagement (see Figs. 8 and 9) with a coacting projection 110 formed upon a slide block 111, which is constrained to a straightline motion by three rollers 112 mounted upon the bed-plate 90. Attached to the slide block 111 is a spring housing 113 which by means of a spring 114, a bolt 115, and a link 116 connects the slide block 111 with a crank arm 117, pinned to the vent damper shaft 82.

Obviously, then, when the operating lever 89 is thrown to the header-engaged position, as in Fig. 9, it causes a rotation of branch arm $96^3$ of crank arm 96, thus moving the latch member 107 from the position shown in Fig. 8 to that shown in Fig. 9. Thus, the slide block 111 is drawn down and through its spring connection with the crank 117, the vent damper 79 is drawn down to cover the vent opening 78, the extra travel of the parts needed to insure proper seating of this damper being taken up through the spring 114.

*Safety device—Operable upon failure of electric energy*

Also supported upon the bed-plate 90 is a solenoid 118 to the core of which is attached a weight 119 of sufficient mass to cause the immediate descent of the solenoid core whenever excitation ceases. As will be more fully explained in connection with the wiring diagram shown in Fig. 15, this solenoid is energized under normal working conditions immediately after the closing of a magnetic starter, indicated in the drawings by the letters MS, whose position on the tumbler housing is substantially as disclosed in Figs. 1 and 3. It should be explained at this time that operation of the magnetic starter, among other things, starts the tumbler fan rotating; and that the solenoid 118 remains energized as long as the main switch in the magnetic starter remains closed or so long as failure of current in the fan circuit does not occur. Below the weight 119 is a lever 120 pivoted on the pin 109 hereinbefore mentioned. One end of this lever is connected by means of a link 121 to a bell crank lever 122 turning freely about a pin 123. The throw of the bell crank lever 122 is limited by the adjustment screws 124 and 125. In Figs. 8 and 9, the solenoid core and parts coacting therewith are shown in the normal position they would occupy during the operating cycle while the solenoid is energized. Should current fail at any time during the operating cycle the solenoid 118 will become de-energized, dropping its core and permitting the weight 119 to fall upon the free end of the lever 120, turning the lever 120 to the position shown in Fig. 10, in moving to which position movement of the bell crank 122 is effected to the position also shown in Fig. 10. Referring to Figs. 8, 9, 10, and 10A, it will be noticed that also pivoted on pin 123 there is provided a trigger 175 lying in back of the bell crank 122. At one end this trigger is provided with a detent hook 176 adapted to engage the projection 110 on slide 111 when the slide is drawn down to the position shown in Fig. 9 by the latch member 107, as above described. The slide will thus be held in its lower position by the trigger even though the operating lever 89 be thrown to its header disengaged position, as is clearly shown in Fig. 10A, which shows the latch member 107 in its raised position and the trigger 175 interlocked with the slide projection 110. Trigger 175 tends always to follow up any movement of the bell crank 122 in a counterclockwise direction by reason of its weighted end 177. However, when the bell crank 122 is moved in a clockwise direction by the dropping of the solenoid core, the trigger is also swung in the same direction under the compulsion of an adjustable abutment bolt 178 carried by the bell crank.

If failure of current occurs when the operating lever 89 occupies its header-engaged position, as in Fig. 9, the upper arm of the bell crank lever 122 will strike the latch member 107, driving it and consequently trigger 175 out of engagement with the slide block projection 110, thus permitting the slide block to move upward under the reaction of the spring 114 and the effect of the counterweight 88. Therefore, if the tumbler has been in operating condition when failure of current occurs the vent damper on top of the tumbler will be automatically opened. Should the failure of current occur when the operating lever 89 is in the header-disengaged position and slide 111 in its upper position, as in Fig. 10, the movement of the bell crank 122 in response to the dropping of the solenoid weight is to the position shown in Fig. 10 where the upper arm of the bell crank moves under the projecting surface 126 of the latch member 107 and so serves as a strut to prevent the operating lever 89 from being moved to its header-engaged position until current has been restored and the solenoid re-energized. Again, should current failure occur when the operating lever 89 is in header-disengaged position and slide 111 in its lower position (damper 79 closed and held in place by trigger 175 as in Fig. 10A), the movement of the bell crank 122 in response to the dropping of the solenoid weight will swing the bell crank in a clockwise direction and cause the trigger 175 to release the slide projection. The slide will now assume its upper position, as in Fig. 10, opening the damper, and the upper arm of the bell crank will pass under the latch 126 to serve as a strut to prevent downward movement of latch member 107 and hence the manipulation of lever 89 to header-engaged position until current to the fan has again been restored. Thus, irrespective of the period in the drying cycle that such current failure may occur, the drying tumbler will be put out of operation and/or held out of operation until after current is once more made to flow in the fan circuit. The bell crank lever 122 is held in its normal rearward position by means of a spring 127. It will be seen as we proceed with the description of the wiring diagram in what manner the fan is energized concurrently with excitation of the solenoid and so becomes operative before operating lever 89 can be moved away from its header-disengaged position.

Before going further with the operating mechanism, attention is called to a detail of construction illustrated in Fig. 6. Fig. 6 is a section taken on line 6—6 of Fig. 5 and shows the junction of the cylinder head 128 with the cylindrical portion of the drum. The drum is equipped with a sliding door 129 having at its lateral edges slide strips 130 slidably mounted in the guideway formed between the cylinder band 131 and an inner band 132. These bands are separated by a filler strip 133. Between the inner band 132 and the outwardly turned flange 134 of the head 128 there is disposed an annular canvas strip 135. All of these parts are held together by a circumferential row of bolts 136 and nuts 137. Such an annular strip of canvas 135 is provided at each end of the drum. They engage the tumbler housing at the ends of the drum and thus prevent by-passing of the heated air around the ends of the drum. To prevent by-passing of air around the circumference of the drum, felt wipers 138 are used (see Fig. 5) which extend longitudinally of the periphery of the drum diametrically opposite one another, their outer edges engaging the interior of the cylindrical shell 12.

Figure 14:
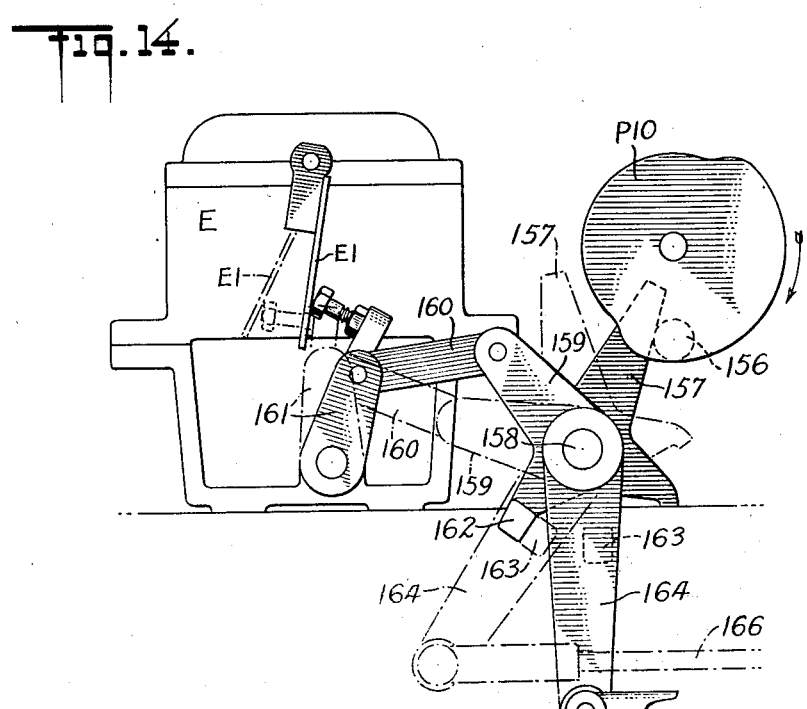
Figure 15:
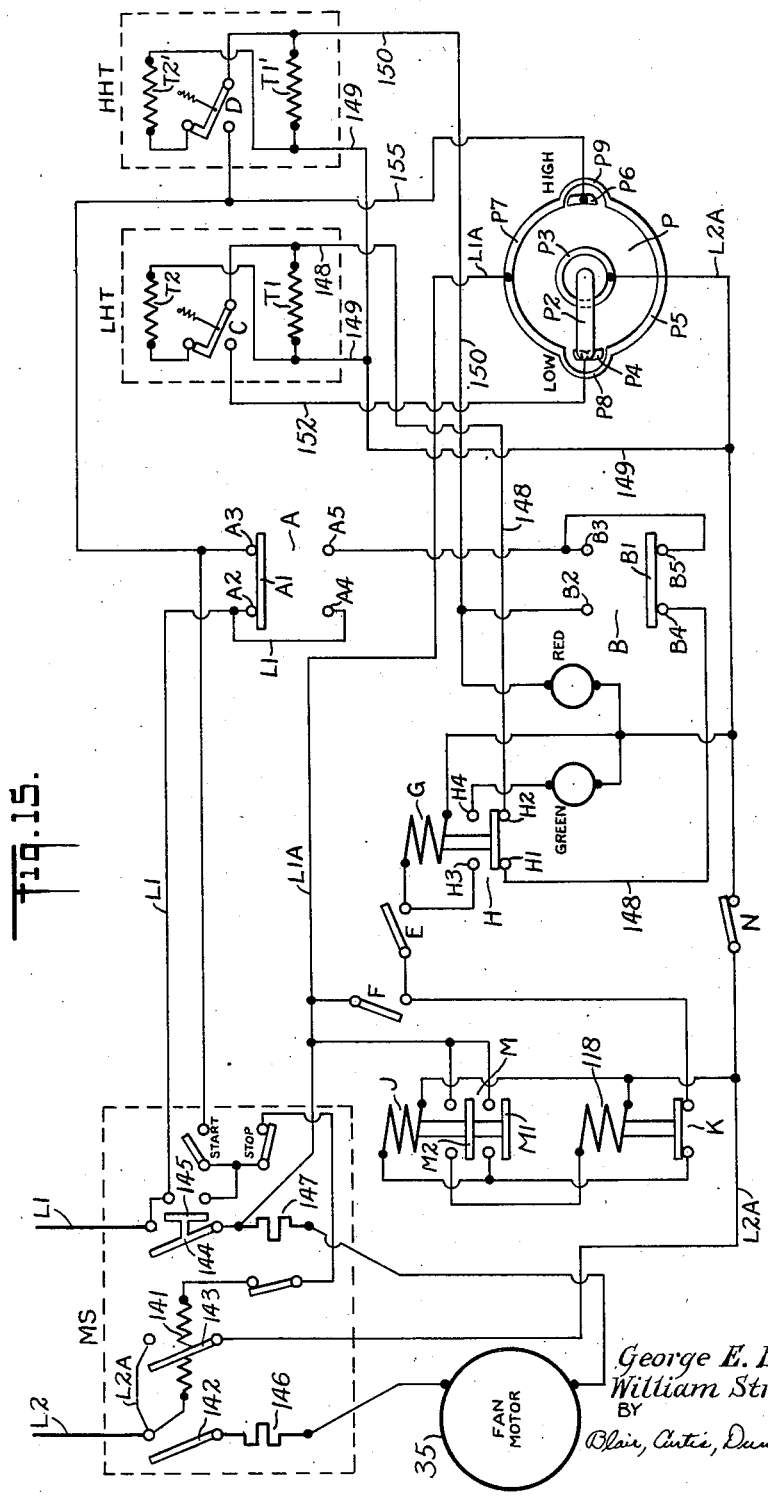
Fig. 15 is a wiring diagram pertaining to the apparatus and devices shown in the preceding figures.

The operation of the apparatus disclosed in Figs. 1 to 15 hereinbefore described will presently be made plain by reference to the wiring diagram of Fig. 15. For the purposes of this description of the mode of operation, it will be assumed that a solvent has been employed in the pre-dryer stages of the dry cleaning operation having a flash point slightly above 140° F., the temperature selected for carrying out the low heat stage of the dryer operation during which from 60% to 70% of the solvent remaining in the clothes after centrifugal extraction is evaporated and driven off from the batch in the dryer drum. A high heat period and a cooling period have been mentioned and have been found to be advantageous in carrying out the principles of the invention, but it should be borne in mind that variations of these stages of operation may be made without departing from the scope of the invention, since a more important feature of the invention resides in drying wholly or in part at a safe temperature relatively to the flash point of the solvent used. Referring to Fig. 15, there will be found various control devices such as electrically operated timers, signal lamps, magnetic switch contactors, and certain other switches not hereinbefore mentioned.

The magnetic starter MS has been mentioned, as have the half-turn motor P and the single-pole, double-throw switch A operated by the hand-operating lever 89. In addition to these control elements there is a single-pole, double-throw switch B which is operated by the half-turn motor concurrently with the operation by said motor of the air dampers to the coil box and the steam valve 41. It will be understood that the half-turn motor operates first to terminate the low heat period of operation, and operates again to terminate the high heat period of operation. After its second operation the half-turn motor will have returned to its initial position and be in condition to control the operations of a succeeding drying cycle. The electrical connections to the half-turn motor are completed at the end of the low heat period through the operation of a low heat timer designated LHT, and the said second operation to terminate the high heat period is controlled by a high heat timer designated HHT.

*Half-turn motor*

Figure 16:
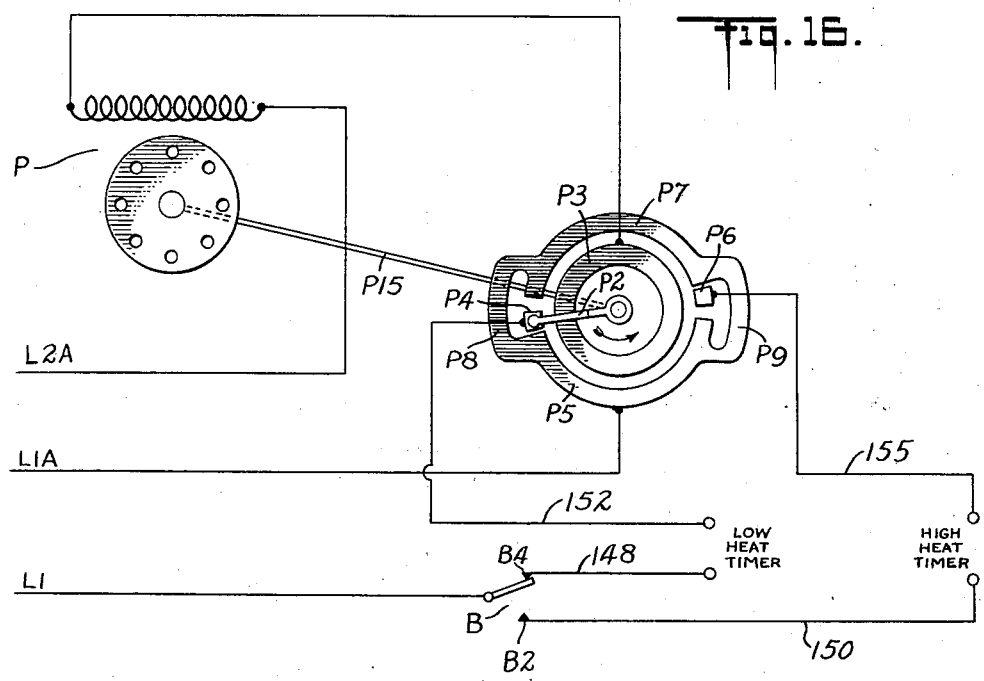
Fig. 16 is a somewhat diagrammatic view of a half-turn motor and circuit-maintaining switch therefor.

Referring to Fig. 16, the half-turn motor P will be seen to be a single phase motor of the squirrel cage type, comprising a stator and rotor. The stator winding is connected between one side of a power line and a commutator ring P3 forming part of a control switch for the motor. This switch comprises a brush P2 rotated in synchronism with the rotor of the half-turn motor, the mechanical connection between the brush shaft and the rotor shaft being indicated by the reference character P15. An outer commutator concentric with P3 comprises four alternating short and long segments P4, P5, P6, and P7. Segments P5 and P7 are, in fact, integral, being connected by the members P8 and P9. As will appear more clearly later, segments P4, P5, P6 and P7 are successively connected under predetermined conditions of tumbler operation and at predetermined intervals of time with the other side of the above-mentioned power line. The connections to the short segments P4 and P6 are completed respectively by switches C and D of the low and high heat timers. When the live line is brought to P4 a half revolution of the rotor is initiated and similarly when the live line is brought to P6, another half revolution is initiated. As soon as the brush P2 rides off of P4 or P6 onto P5 or P7, the excitation of the motor for the remainder of the respective half-turn is maintained through those segments. The motor will stop when its brush rides off of P5 or P7 onto the short segments P6 or P4.

*The timers*

Figure 17:
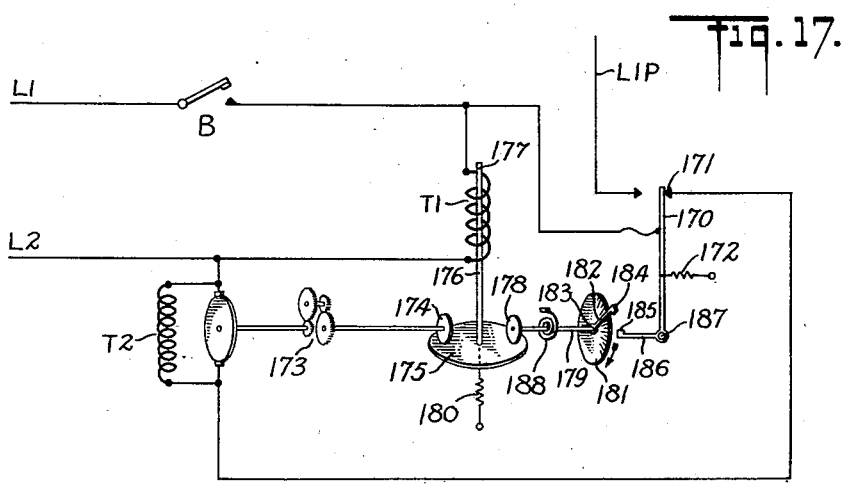
Fig. 17 is a somewhat diagrammatic view of a timing device.

Timers LHT and HHT control respectively switches C and D in the half-turn motor circuits. Since these timers are alike, the following description will suffice for an understanding of the construction and operation of both. Referring to Fig. 17, a timer will be seen to comprise a motor T2 connected in shunt to power lines L1, L2 through a movable switch member 170 normally held in engagement with a fixed contact 171 by means of a spring 172. The shunt motor circuit will thus normally energize the motor whenever a switch B in line L1 is closed. The rotor of the motor is connected by means of suitable gearing 173 with a friction disk 174 adapted to be engaged by and to drive a friction disk 175. Disk 175 is fixed upon a shaft 176 forming an extension of the reciprocatory armature 177 of a magnet T1 which is connected in a circuit shunting the motor T2. When switch B is closed magnet T1 is energized and moves the friction disk 175 into mutual operative engagement with the disk 174 and a friction disk 178 fixed upon a shaft 179. A spring 180 tends normally to hold the disk 175 out of engagement with the disks 174 and 178 when the magnet T1 is unexcited. Shaft 179 drives a timing disk 181 which may be calibrated to indicate minutes. Rotatable with the timing disk 181 is a hand 182 which may be adjustably positioned with respect to a zero position on the dial by means of knurled nut 183. At the end of the hand 182 is a lug 184, adapted at the zero position to engage a coacting lug 185 carried by an arm 186 rotatable with the switch arm 170 about the axis 187, against the tension of the spring 172. Moving the switch arm about its axis will break the motor circuit at 171 and make a connection between the line L1 and a conductor (in this figure designated L1P) which leads to the half-turn motor. This conductor corresponds with either wire 152 or wire 155 of Fig. 15, depending upon whether the timer occupies the LHT or HHT position.

The timing hand will be set back from the zero position on the dial a distance determined by the number of minutes for which the timer is desired to function. In operation, when switch B is closed, the motor starts to rotate and the magnet armature is drawn down to enable the motor to rotate the timing dial by means of the friction transmission connecting the motor shaft with timing shaft 179. Rotation of the timing dial will carry on until the circuit is broken at 171 by engagement of lug 184 with lug 185. Rotation of the timing dial also winds up a spring 188. When the motor circuit is broken at 171 the motor stops rotating, but the disk will not return to its original position until the magnet is deenergized by breaking the line circuit at B. When this is done the friction disk 175 is drawn out of engagement with disks 174 and 178 by the spring 180. Spring 188 then returns the timing dial and hand to their original positions and spring 172 returns the switch arm 170 into contact with switch contact 171. Thus the parts are reset to function all over again when next the switch B is closed.

*Wiring diagram*

The wiring diagram also shows a green signal lamp marked "Green" and a red signal lamp marked "Red." A magnetic contactor G which serves to operate the switch H, a magnetic contactor J which serves to operate the switch M, and a switch K, which under certain conditions serves to complete a circuit through the magnetic contactor J, are shown on Figs. 3 and 15 of the drawings. There is also shown a thermostatic control switch F, the bulb for operating which is indicated at 139 in Fig. 7 where it is shown disposed in the air passage leading to the top of the tumbler cylinder in a position opposite the thermostat bulb 45. The bulb 139 is connected to the switch F by means of flexible tubing 140. The thermostatic control of the switch F should be such that the switch will close when the temperature in the air passage falls to or below the temperature setting of the thermostatic valve 44. It will be understood that both the thermostatic switch F and the thermostatic valve 44 are controlled by the temperature of the air entering the tumbler drum.

Referring to the wiring diagram, L1 and L2 indicate respectively the two sides of a power line entering the magnetic starter MS. It will be seen that the line L1 is connected by the switch contact arm A1 in the upper position of that arm through switch contacts A2 and A3 to the starting switch of the magnetic switch MS. This connection only obtains when the machine starting lever 89 stands in its forward or disengaged position. The momentary closing of the starting switch, indicated on the drawings by the word "Start," completes a circuit through the normally closed stop switch, indicated by the word "Stop," through the magnet coil 141 of the magnetic starter. The energizing of this coil closes the main circuit contactors 142, 143 and 144, and as soon as these main circuit contactors come to closed-circuit position the circuit through the magnet coil 141 is maintained by means of a bridge member 145 which completes a circuit shunting the contacts A2, A3 of switch A and the "Start" switch, the maintaining circuit then being made from L1 through the bridge member 145, the "Stop" switch and the magnet coil 141 back to line L2.

The closing of contacts 142 and 144 completes a circuit through the fan motor which immediately starts the tumbler fan in operation, and since at this time the tumbler vent damper 79 is open, atmospheric air is drawn in at the top of the tumbler through the tumbler cylinder and discharged out-of-doors. Some air will also be drawn through the open lower rear damper 20, over the inner steam coil 27, the latter being at this time under the control of the thermostatic valve 44, into the tumbler drum chamber. Should, for any reason, the fan motor not start, thermal elements in the magnetic starter, indicated at 146 and 147, will heat up and, after a few seconds of this abnormal condition, throw the main switch to open position. It will be noted that the line L2 has a branch L2A which is closed by the switch contact 143, and also that a branch line L1A takes off from line L1 at a point beyond switch contact 144. Thus, we have a circuit L1, L2 through the fan motor and a circuit L1A, L2A in shunt therewith, adapted to supply current to the various control devices hereinbefore mentioned. It will be understood that as soon as the main switch of the magnetic starter closes, the line L1A becomes alive through one branch as far as the commutator segment P7 of the half-turn motor and through another branch as far as the thermostatic switch F.

The switch F is normally held in open position at temperatures above the selected temperature at which the apparatus is to operate during the low heat period, as, for instance, 140° F. If, at the beginning of a cycle, the temperature stands below or at 140° F., the switch F will be closed and a circuit will be completed from L1A through switch contact K, through the coil of the magnetic contactor J and back to the line L2A. Thus, the magnetic contactor will be energized and drawing up its core will complete circuits respectively by means of switch contacts M1 and M2 from line L1A through magnetic contactor J and solenoid 118. Thus, the solenoid will become energized and by the raising of its core open the circuit through the switch K, the magnetic switch J, M thereafter being maintained by current flowing through the switch contact M and its connections. Switch K (see Fig. 3) is mounted upon the tumbler housing adjacent the solenoid 118. Its interior contact member, not shown, is operably associated with an exterior arm K1, normally biased, as by a spring K2, to hold the switch K in open position whenever permitted to act through the energization of the solenoid 118. Upon de-energization of the solenoid, the dropping of the weight 119 produces movement of the arm K1 to close the switch K.

It will be remembered that with the solenoid 118 de-energized the vent damper 79 stands in open position and an interlock is maintained between the bell crank 122 and latch member 107, preventing operation of the belt-shifter operating lever 89. However, upon energization of solenoid coil 118, the weight 119 is removed from engagement with the lever 120 releasing the belt-shifter mechanism for hand actuation.

*Low heat period of operation*

Now, upon the operator throwing the hand lever 89 to its rearward or header-engaging position, as shown in Fig. 9, one of the driving belts is shifted to the tight pulley on the jack shaft and the tumbler drum rotates. At the same time the vent damper at the top of the tumbler is closed. Also, the throw of operating lever 89 shifts the position of the switch A so that the movable switch contact A1 bridges the contacts A4, A5 and, since contact A4 is permanently connected to the line L1, a live circuit is established through contacts A4, A5 of switch A, and contacts B4, B5 of switch B, the switch contact B1 being at this time in its lower position, through a line 148 including switch member H of magnetic contactor G, H to the low heat timer LHT. From line 148 a circuit is completed through the magnet T1 of the timer back to a line 149 connecting with the line L2A. The circuit is also completed from line 148 through the motor T2 of the timer and line 149 to L2A. Thus, the low heat timer is set in operation concurrently with the throwing of the operating lever 89.

Now, as will be more fully explained hereinafter, after a predetermined number of minutes has elapsed from the making of the contact A4 and A5 in switch A, switch C in the low heat timer will be closed, thus connecting the half-turn motor commutator segment P4 with the line L1, and as at this time the half-turn motor switch arm or brush P2 occupies the position shown in Fig. 15, the circuit will be completed through the half-turn motor to the line L2A. Further, when the half-turn motor is thus conditioned the lower air damper 20 will be open, the upper damper 19 closed, and the steam valve 41 will also be closed, steam being admitted to the steam coils through the thermostatic valve 44. The energization of the half-turn motor starts it upon its first half revolution, requiring a short period of perhaps thirty seconds for completion. After approximately one-tenth of this half revolution, or after an interval of three seconds has elapsed, the brush P2 moves off segment P4 on to segment P5, and thus becomes connected directly with line L1A. For the rest of its half revolution the motor is energized from L1A through the motor coils back to L2A. At the end of the half revolution the brush moves off segment P5 on to segment P6 which at this time is not connected with line L1. The half-turn motor accordingly stops after making its half turn.

High heat period of operation

When the half-turn motor thus makes its half revolution it starts the high heat period of the drying cycle by switching the air intake dampers so that air instead of being admitted through the lower air inlet 18 is admitted through the upper inlet 17. Thus, air is drawn through the coil box over both coils. Also, the heating coils which up to this time have been under the control of the thermostatic valve 44 now receive their steam directly through the mechanically-operated valve 41 in the main steam line, and thus will receive full steam. The thermostatic valve will be closed by the higher temperature obtaining during this period, but its function is not needed after the opening of the valve 41.

As mentioned above, each half rotation of the half-turn motor changes the position of the parts of the switch B. This may be best understood by reference to Figs. 7 and 13. Upon one end of the shaft of the half-turn motor P there is a cam P10. A roller B8 carried by a rocker arm B7 mounted upon a rock shaft B6 rides on this cam, rocking the rock shaft first in one direction and then back again during succeeding half revolutions of the half-turn motor. This rocking movement acting through an arm B9 depresses or permits to rise a switch plunger B11. It is thought unnecessary to show the interior arrangement of the switch contacts, which have been designated B1, B2, B3, B4, and B5, in the wiring diagram. It will be sufficient to note that in the position of the switch parts during the low heat period, as shown by the solid lines in Fig. 13, the movable switch contact B1 connects with the fixed contacts B4, B5, while in the position of the arm indicated by dash-and-dot lines the member B1 bridges contacts B2, B3. When the half-turn motor operated to change from the low heat to the high heat period, it operated switch B to break contacts B4, B5, and make contacts B2, B3. When the live circuit through these contacts was broken the magnet in the low heat timer was de-energized and through spring reaction, as above described, the timer was automatically reset to zero, ready for the beginning of another cycle of operation.

When the half-turn motor thus makes its first half revolution, starting the high heat period of drying, a circuit is completed by way of B2, B3 through the red lamp, giving a visual indication that the tumbler is in the high heat phase of operation. At the same time, current flows through wire 150, through the magnet T1$^1$ and motor T2$^1$ of the high heat timer HHT and through wire 149, starting the high heat timer to control the period of high heat operation. After a time, the determination of which has been established by tests, has elapsed, switch D is closed completing a circuit through 155 to contact P6 of the half-turn motor which is energized and makes a second half revolution back to its original position. This movement reverses the air intake dampers 19 and 20, and closes the steam valve 41, so that steam now can only be admitted to the steam coils through the thermostatic valve 44. The time setting of the high heat timer is determined by the period necessary completely to dry and deodorize the load.

The second half revolution of the half-turn motor shifts the contact member B1 of switch B, breaks the circuit between B2 and B3 and reconnects contacts B4 and B5. Thus, the high heat timer is de-energized and returns to zero position and the red light is cut out of circuit.

During the high heat period of operation, the temperature of the air passing through the tumbler may be carried well above 200° F., because by this time only a small amount of solvent remains in the clothing and it is thus impossible to develop an explosive mixture in the dryer.

Cooling period of operation

Under some conditions the cycle of operations might terminate here, but it has been found in practice that the time usually consumed to unload and reload the tumbler is insufficient to cool the tumbler to a temperature below the flash point of the solvent, that is, the temperature established for the low heat period. It has been found desirable, therefore, in order to secure complete safety, to introduce a cooling period immediately succeeding the high heat period in order that the temperature of the air entering the dryer may reduce to the temperature setting of the thermostatic valve 44.

The second half-turn of the half-turn motor, at the end of the high heat period, closes the switch E, as will now be described. Projecting from the side of the cam P10, as shown in Figs. 7 and 14, is a roller 156. In Fig. 14 the position of the roller with respect to the axis of the cam when the motor is in its high heat position, is shown. When the high heat timer closes switch D in the timer, the half-turn motor operates from high heat to low heat position and cam P10 moving clockwise (as seen in Fig. 14) carries roller 156 against an arm 157. The cam completes its half-turn so that roller 156 moves arm 157 out of its path, thus producing a partial counterclockwise rotation of a shaft 158 mounted on the tumbler housing, which has fastened thereto adjacent the left-hand side of the tumbler a bell crank 159, one branch of which is connected by a link 160 to a crank 161 rotatable in the casing of switch E, and which operates the switch E through movement of an external switch arm E1, from the full line position of Fig. 14 to to the dash-and-dot position. Movement of the switch arm E1 as described closes the switch E. Another branch of the bell crank 158 carries a lug 162 adapted to engage, under conditions to be presently explained, a corresponding lug 163 on a crank 164, which is freely mounted on the shaft 158 and which during operation of the tumbler normally occupies the position shown in solid lines in Fig. 14. The straightening of the toggle formed by the members 159 and 160 locks the switch E in closed position.

At this time the room air is being drawn exclusively over the inner heating coil through the lower intake damper and a reduction of the temperature of the air entering the drum takes place, since the outer steam coil, being by-passed by the incoming air, is no longer effective in determining its temperature and the thermostatic valve 44 being now in control of steam to the coils. When now the temperature is lowered to the setting of the thermostatic switch F, this switch closes and there is a circuit completed from L1A through switch F, through switch E to the coil of the magnetic contactor G, which, being thus energized, breaks the circuit through line 148 between contacts H1 and H2 and establishes a circuit by way of contacts H3 and H4 from the switch E through the green lamp to line L2A. The lighting of the green lamp indicates to the operator the end of the cooling period and of the drying cycle. It should be noted, too, that the breaking of the circuit through line 148 by operation of the switch H to its new position breaks the circuit through this line to the low heat timer so that, should there be a delay in shifting the operating lever 89 to stop rotation of the tumbler drum and shift switch A, the low heat timer will not automatically function to switch the tumbler into another high heat period, it being understood that when the green light shows, the operator, in order to remove the load, must throw the operating lever 89 to the header-disengaged position.

Means is provided for enabling this movement of the operating lever to open switch E, thus deenergizing the coil of the magnetic contactor G, permitting the switch H to return to its position closing the circuit through line 148 and breaking the circuit through the green lamp, thus preparing for energization of the low heat timer when again the lever 89 is shifted to start the next drying cycle. The means for opening switch E will best be understood by reference to Figs. 3, 8 and 14.

Extending upwardly from the segment-operating link 98 is a rigid arm 165 which, by means of a spring-actuated link 166, is connected to the lower end of crank arm 164. It will be noted that when the switch E was closed by the straightening of the toggles 159, 160, the lug 162 was brought into engagement with lug 163 on arm 164. When, however, the operating lever 89 is drawn forward to disengage the header mechanism, the rearward movement of the link 98 through arm 165 and link 166 causes oscillation of arm 164 to the position shown in dot-and-dash lines in Fig. 14. This movement of arm 164 through the lugs 162 and 163 causes movement of bell crank 159 to break the toggle 159, 160 opening the switch E and also restoring the arm 157 to its original position, ready for the beginning of the cooling period in the next cycle. When the operating lever 89 is thrown to engaged position at the beginning of the next cycle, the crank 164 is drawn back to its original position.

Since certain materials are adversely affected by exposure to high heats while drying, a manually operable switch, such as N (see Fig. 15), may be inserted in line L2A. When opened by hand, all automatic timing operations will be prevented, the operation of the tumbler being held indefinitely at the low heat stage.

As many possible embodiments may be made in the above invention and as many changes might be made in the embodiments above set forth, it is to be understood that all matter hereinbefore set forth or shown in the accompanying drawings is to be interpreted as illustrative and not in a limiting sense.

We claim:

1. In apparatus of the character described, in combination, a treating chamber, means for agitating therein the material to be treated, means for causing a current of air to pass therethrough, thermostatic means sensitive to the temperature of said air current and operable to maintain said temperature at a predetermined value, shiftable means operable to render ineffective the thermostatic means and to effect a rise in temperature of said air current above said predetermined value, and time control means for the shiftable means adapted to determine the periods during which the apparatus remains in operation at lower and higher temperatures.

2. In apparatus of the character described, in combination, a treating chamber, means for agitating therein the material to be treated, means for causing a current of air to pass therethrough, thermostatic means sensitive to the temperature of said air current and operable to maintain said temperature at a predetermined value, shiftable means operable to render ineffective the thermostatic means and to effect a rise in temperature of said air current above said predetermined value, time control means for the shiftable means adapted to determine the periods during which the apparatus remains in operation at lower and higher temperatures, a signal device, and means operable in response to the operation of said shiftable means to render said signal device effective at the beginning of the higher heat period.

3. In apparatus of the character described, in combination, a treating chamber, means for agitating therein the material to be treated, means for treating air to control its temperature, means for passing the treated air through said chamber, means sensitive to the temperature of the treated air and means insensitive to said temperature for alternatively controlling the operation of said air treating means, means for selecting one or the other of said controlling means for operation, and timing means for controlling the operation of said selecting means.

4. In apparatus of the character described, in combination, a treating chamber, means for agitating therein the material to be treated, means for causing a current of air to pass therethrough, heating means for said air, a first control means sensitive to the temperature of said air current for regulating the operation of said heating means to maintain the temperature of said current of air below a predetermined value, a second control means adapted to take over the control of said heating means to effect a rise in temperature of said air current above said predetermined value, and time controlled means for effecting the transfer of control from said first to said second control means.

5. In apparatus of the character described, in combination, a treating chamber, means for agitating therein the material to be treated, means for causing a current of air to pass therethrough, heating means for said air, a steam supply, means for connecting said heating means with said steam supply comprising a thermostatically controlled element effective during one period of the operation of said apparatus to restrict the steam supply to said heating means, disabling means for rendering said element ineffective and providing an uncontrolled flow of steam to said heating means for a second period of time, and timing means for controlling the operation of said disabling means to determine the duration of each of said periods of time.

6. In apparatus of the character described, in combination, a treating chamber, a rotatably mounted cylinder in said chamber, drive means for said cylinder, control means for said cylinder drive, means for moving a current of air through said chamber and cylinder, thermostatic means sensitive to said air current and operable to maintain said temperature at a predetermined value, movable means operable to render ineffective the thermostatic means and to effect a rise in temperature of said air current above said predetermined value, time controlled means for the movable means adapted to determine the period during which the apparatus remains in operation at the lower temperature, and means whereby the operation of the time controlled means is initiated by actuation of said control means to effect cylinder drive.

7. In apparatus of the character described, in combination, a treating chamber, a rotatably mounted cylinder in said chamber, drive means for said cylinder, control means for said cylinder drive, means for moving a current of air through said chamber and cylinder, thermostatic means sensitive to said air current and operable to maintain said temperature at a predetermined value, movable means operable to render ineffective the thermostatic means and to effect a rise in temperature of said air current above said predetermined value, time controlled means for the movable means adapted to determine the period during which the apparatus remains in operation at the lower temperature, means whereby the operation of the time controlled means is initiated by actuation of said control means to effect cylinder drive, and thermostatic means sensitive to the temperature of said air current for preventing operation of said control means if said temperature is above said predetermined value.

8. In apparatus of the character described, in combination, a drying chamber, means for treating air to control its temperature, means for passing the treated air through said chamber, means sensitive to the temperature of the treated air and means insensitive to said temperature for alternatively controlling the operation of said air treating means, means for selecting one or the other of said controlling means for operation, and timing means for controlling the operation of said selecting means.

9. In apparatus of the character described, in combination, a drying chamber, means for causing a current of air to pass therethrough, heating means for said air, a first control means sensitive to the temperature of said air current for regulating the operation of said heating means to maintain the temperature of said current of air below a predetermined value, a second control means adapted to take over the control of said heating means to effect a rise in temperature of said air current above said predetermined value, timing means operable at the end of a first predetermined period of time to transfer control from said first to said second control means and thus effect said rise in temperature and again operable at the end of a second predetermined period of time to retransfer the control back to said first control means, thus starting a third period during which the temperature of the air current is permitted to fall to the predetermined value of said first period.

10. In apparatus of the character described, in combination, a drying chamber, means for causing a current of air to pass therethrough, heating means for said air, a first control means sensitive to the temperature of said air current for regulating the operation of said heating means to maintain the temperature of said current of air below a predetermined value, a second control means adapted to take over the control of said heating means to effect a rise in temperature of said air current above said predetermined value, timing means operable at the end of a first predetermined period of time to transfer control from said first to said second control means and thus effect said rise in temperature and again operable at the end of a second predetermined period of time to retransfer the control back to said first control means, thus starting a third period during which the temperature of the air current is permitted to fall to the predetermined value of said first period, a signal device, and means sensitive to the temperature of said air current for rendering said signal device effective to indicate that the temperature has fallen to said predetermined value.

11. In apparatus of the character described, in combination, a drying chamber, means for causing a current of air to pass therethrough, heating means for said air, a steam supply, means for connecting said heating means with said steam supply comprising a thermostatically controlled element effective during one period of the operation of said apparatus to restrict the steam supply to said heating means, disabling means for rendering said element ineffective and providing an uncontrolled flow of steam to said heating means during a second period of time, and timing means for controlling the operation of said disabling means to determine the duration of said one period of time.

12. In apparatus of the character described, in combination, a treating chamber, a rotatably mounted cylinder in said chamber, drive means for said cylinder, control means for said cylinder drive, means for moving a current of air through said chamber and cylinder, thermostatic means sensitive to the temperature within said chamber at a predetermined point operable to maintain said temperature at a predetermined value, movable means operable to render ineffective the thermostatic means and to effect a rise in temperature at said predetermined point in said chamber above said predetermined value, timing means for the movable means adapted to determine the period during which the apparatus remains in operation at the lower temperature, means whereby the operation of the timing means is initiated by actuation of said control means to effect cylinder drive, and thermostatic means sensitive to said temperature within said chamber for preventing operation of said control means if said temperature is above said predetermined value.

GEORGE E. BOWDOIN.
WILLIAM STROBRIDGE.